Nov. 13, 1951 W. V. COVERT ET AL 2,575,313
CHAIN TIGHTENER
Filed May 7, 1946 2 SHEETS—SHEET 1
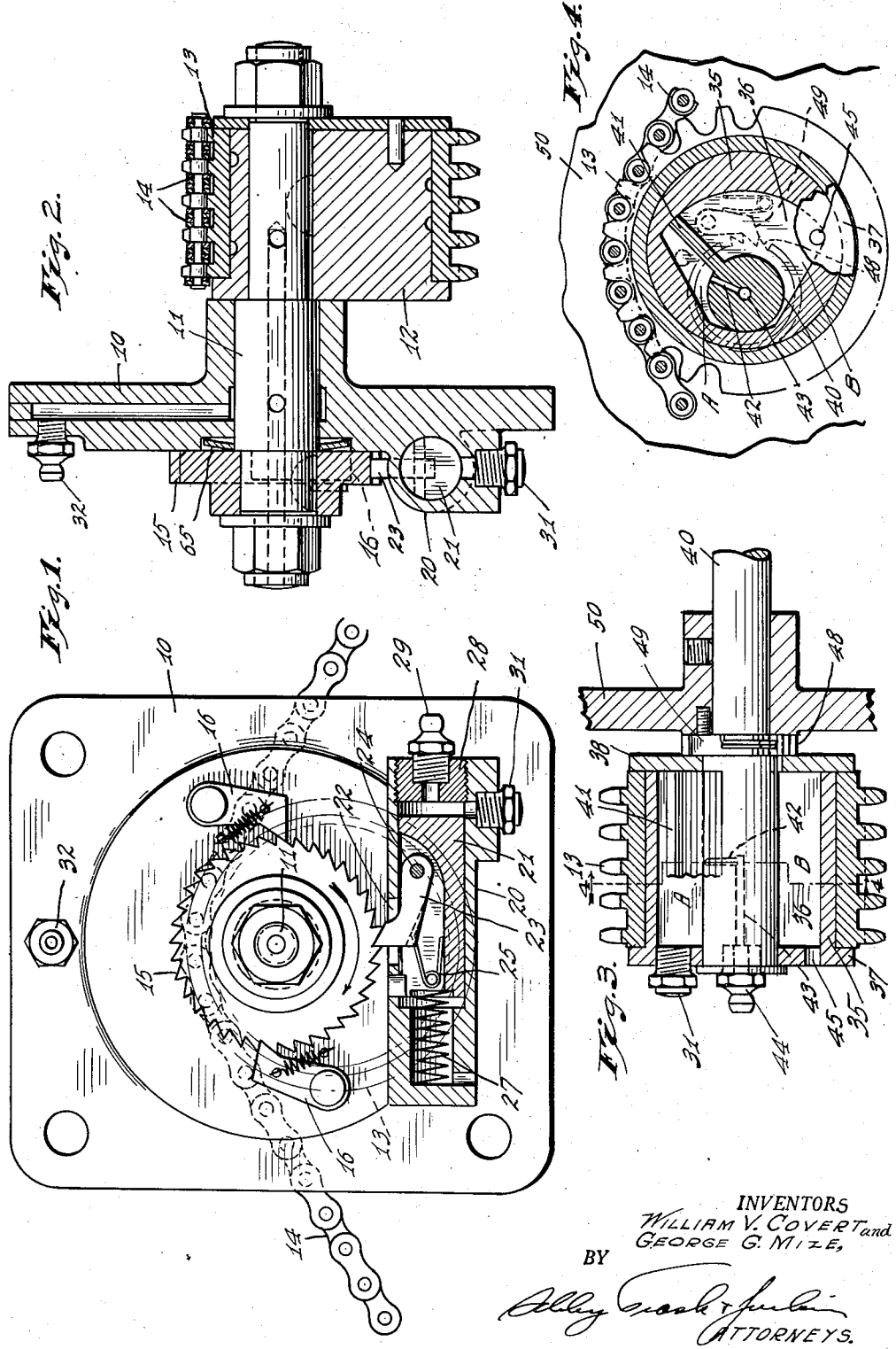
INVENTORS
WILLIAM V. COVERT and
GEORGE G. MIZE,
BY
ATTORNEYS.

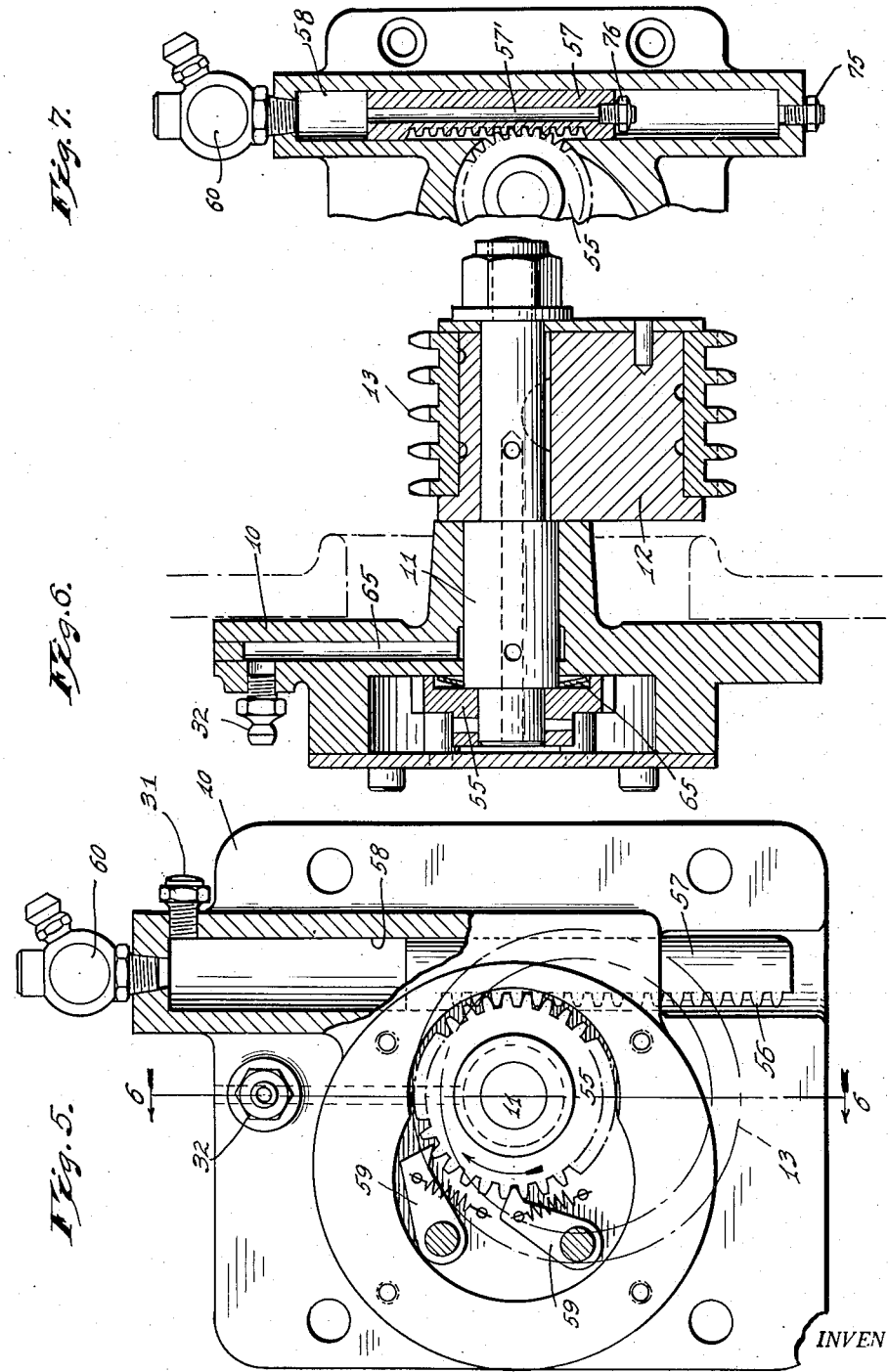

Patented Nov. 13, 1951

2,575,313

UNITED STATES PATENT OFFICE 2,575,313

CHAIN TIGHTENER

William V. Covert and George G. Mize, Indianapolis, Ind., assignors to Diamond Chain Company, Inc., Indianapolis, Ind., a corporation of Indiana Application May 7, 1946, Serial No. 667,971

12 Claims. (Cl. 74—242.11)

This invention relates to devices for maintaining proper tension in power-transmitting chains, and in its more specific aspects to devices in which the desired tension is maintained by adjustment of a sprocket or other element over which one stretch of the chain runs. Because adjustments are required at such infrequent intervals that the necessity for adjustment may be overlooked or postponed until the chain has become unduly loose and because of the danger of over-tightening, as well as for other reasons, the maintenance of chain-tighteners in a proper state of adjustment frequently presents a problem. Automatic chain-tighteners have been proposed, but many of them are unduly complicated while others involve danger of over-tightening the chain.

It is an obpject of our invention to produce a chain-tightener which, by automatically limiting the magnitude of chain-tightening effort, will prevent over-tightening of the chain. Another object of our invention is to produce a chain tightener which can readily be operated as an incident to the performance of other maintenance operations on the machine or apparatus with which the chain tightener is associated. More specifically, it is our object to produce a simple and inexpensive chain-tightener which can be operated by pressure-lubricating apparatus employed to lubricate the machine with which the chain-tightener is associated and which, when so operated, will insure maintenance of proper adjustment.

In carrying out our invention in its preferred form, we employ a chain-engaging element such as an idler sprocket mounted for movement in a chain-tightening direction; and to move such element in the chain-tightening direction, we employ a fluid-pressure operated device adapted to be supplied with grease or other fluid through a conventional form of pressure lubricating fitting. Ratchet means of any suitable form may be employed to prevent movement of the chain-tightening element in a reverse direction. Associated with the fluid-pressure operated device we provide means for limiting the maximum fluid-pressure effective to move the element in the chain-tightening direction, thereby limiting to a predetermined amount the tension which can be introduced into the chain by operation of the chain-tightener.

The accompanying drawing illustrates our invention: Fig. 1 is an end elevation and Fig. 2, a side elevation, both in partial section, illustrating one form of chain tightener; Fig. 3 is a side elevation of a modified form of chain tightener; Fig. 4 is a transverse section on the line 4—4 of Fig. 3; Fig. 5 is an end elevation, in partial section, of still another modification; Fig. 6 is a section on the line 6—6 of Fig. 5; and Fig. 7 is a view similar to Fig. 5 showing a further modification.

The device illustrated in Figs. 1 and 2 embodies a base 10 rotatably supporting a shaft 11 which extends through and in opposite directions beyond the base. Keyed or otherwise secured to the shaft 11 on one side of the base 10 is a bearing member 12 which rotatably supports a chain-tightening idler sprocket 13. The common axis of the bearing member 12 and sprocket 13 is eccentric to the axis of the shaft 11, so that by rotative adjustment of the shaft 11 a chain 14 running over the idler sprocket 13 may be tightened.

On the opposite side of the base 10 from the bearing member 12, there is secured to the shaft 11 a ratchet 15 which cooperates with one or more pawls 16 adapted to prevent rotation of the shaft 11 in one direction. For advancing the shaft 11 in the opposite, or chain-tightening, direction, we provide, conveniently integral with the base 10, a cylinder 20 which slidably receives a piston 21. The cylinder 20 extends generally tangentially of the ratchet 15 and is provided adjacent such ratchet with a slot 22 through which there projects a pawl 23. The pawl 23 is pivotally connected to the piston, as indicated at 24, and is urged outwardly into engagement with the ratchet 15, as by means of a spring 25.

It will be obvious from the above description that by oscillation of the piston 21 the ratchet 15, and with it the shaft 11 and bearing member 12, can be advanced in a chain-tightening direction. For the purpose of oscillating the piston 21 in the cylinder 20, we provide a compression spring 27 which, acting between one end of the cylinder 20 and the piston 21, biases the latter in one direction; and we arrange the piston 21 so that it may be forced in the opposite direction by fluid-pressure in the opposite end of the cylinder. As shown, the remote end of the cylinder is closed by a plug 28 in which there is mounted a lubricating fitting 29 of the type adapted to receive grease under pressure from a suitable source. The fitting 29, however, differs from the conventional fitting in that it lacks a check valve preventing the discharge of grease from the cylinder.

As will readily be understood, the base 10 is intended for mounting on a frame or other structure in such a position that the sprocket 13 will engage a stretch of the chain 14 which the device is to keep tight. Since the pawls 16, as shown, are arranged to prevent counter-clockwise rotation of the shaft 11, the device is so mounted in association with the chain drive that clockwise rotation of the shaft 11 will produce tightening of the chain. When the chain is to be tightened, a grease "gun" is applied to the fitting 29 and grease under pressure is forced into the cylinder 20 to advance the piston therein. In this movement of the piston, the pawl 23 engages the ratchet 15 to rock the shaft 11 and bearing member 12 in the chain-tightening direction. When the gun is removed from the fitting 29, the spring 27 will force the piston rearwardly. Any grease displaced from the cylinder 20 by such rearward movement of the piston 21 will escape through the fitting 29. The pawls 16 co-operate with the ratchet 15 to prevent or limit reverse movement of the shaft 11.

In order to prevent the application of too great a chain-tightening effort, we employ a pressure-relief valve 31 which communicates with the interior of the cylinder 20 between the piston 21 and the plug 28. Obviously, such a relief valve will limit the fluid pressure in the cylinder 20 and will thus limit to a maximum the chain-tightening effort. By properly coordinating the cross-sectional area of the cylinder 20 and the eccentricity of the bearing member 12 with the relief pressure of the valve 31, chain-tightening effort can be limited to any desired predetermined maximum.

The lubricating fitting 29 is preferably of the type which is used throughout the machine with which the chain-tightener is associated. One such fitting, provided for lubrication of the idler sprocket 13, is indicated at 32. Ordinarily, a machine equipped with such fittings will be lubricated at predetermined intervals, and in the course of such lubrication the gun which is being used will be applied to the fitting 29 and grease forced into the cylinder 20. Movement of the piston 21 under the influence of fluid pressure will rotate the shaft 11 in the chain-tightening direction until slack has been taken up. Thereafter tension in the chain will oppose further rotation of the shaft and will cause the fluid pressure in the cylinder 20 to increase to the maximum value permitted by the relief valve 31. If the chain possessed sufficient slack to permit a tooth of the ratchet 15 to pass one of the pawls 16, the operation just described will result in a permanent chain-tightening advance of the idler sprocket. On the other hand, if the chain originally possessed so little slack that it becomes taut and the relief valve 31 opens before a ratchet-tooth has passed one of the pawls 16, the idler sprocket will drop back to its original position when the gun is removed from the fitting 29. Thus over-tightening of the chain is prevented.

In the modification of the invention illustrated in Figs. 3 and 4, the idler sprocket 13 is rotatably mounted upon a cylindrical bearing member 35. Such bearing member is provided with a chamber 36 which extends through it from one end to the other and which is closed at its ends by closure disks 37 and 38. The disks 37 and 38 have aligned openings which are eccentric with respect to the axis of the bearing member 35 and which are adapted to receive a stationary shaft 40 about which the bearing member swings in its chain-tightening movement.

Within the chamber 36, the shaft 40 is provided with a vane 41 which, in co-operation with the body of the shaft itself, divides the chamber 36 into two pockets designated respectively as A and B in Fig. 4. The chamber 36 has too opposite side walls both concentric with the axis 40, one on the radius of such shaft and the other on the radius on the outer edge of the vane 41 so as to maintain an effective seal between the chambers A and B as the bearing member 35 swings about the axis of the shaft.

The pocket A of the chamber 36 communicates through a radial passage 42 with an axial passage 43 extending to one end of the shaft and there communicating with a lubricating fitting 44. The other pocket B is provided with a vent opening, conveniently a hole 45 extending through the disk 37. In line with the pocket A, the disk 37 is also provided with a pressure-relief valve 31.

When grease is forced through the fitting 44, it passes through the passages 43 and 42 into the chamber A, creating therein a pressure which tends to swing the bearing member 35 in a counter-clockwise direction about the axis of the shaft 40 to produce chain-tightening. The maximum extent of the chain-tightening will obviously be limited by the pressure-relief valve 31 which operates to limit fluid pressure in the chamber A to a predetermined maximum. In this device, since the pressure-operated element moves progressively in but one direction throughout the entire range of chain-tightening adjustment, it is not essential that the fitting 44 be valveless, as was the fitting 29 in the device of Figs. 1 and 2.

To prevent chain-loosening movement of the bearing member 35, a stationary ratchet 48 may be secured to the shaft 40, or to a support 50 in which such shaft is mounted, in position to cooperate with a pawl 49 suitably mounted on the disk 38.

The modification illustrated in Figs. 5 and 6 is similar to that shown in Figs. 1 and 2 in that it embodies a rock shaft 11 rotatably mounted in a base 10 and provided on one side of such base with a bearing member 12 for the idler-sprocket 13. In this instance, means for rotating the shaft 11 to produce tightening of the chain embodies a pinion 55 which is secured to the shaft 11 and which meshes with a series of rack teeth 56 provided in one side of a piston 57 that is slidably mounted in a cylinder 58. As will be obvious, downward movement of the piston 57, such as will be created by the supply of fluid under pressure to the upper end of the cylinder 58, will rotate the pinion 55 and shaft 11 rigid therewith to produce chain-tightening. Pawls 59, co-operating with the teeth of the pinion 55 will prevent rotation of the shaft 11 in the opposite direction.

To effect movement of the piston 57 in a chain-tightening direction, the cylinder 58 is provided at one end with a lubricating fitting 60 through which grease under pressure may be forced into the cylinder. The fitting 60, in this particular modification, is of the type known as a "hydraulic shut-off fitting" and embodies a valve which shuts off at a predetermined pressure to stop further passage of grease. Although maximum chain-tightening effort may be normally limited by a shut-off fitting, it is frequently desirable to provide the cylinder with a pressure-relief fitting 31 in order to prevent the possibility of undue chain-tightening resulting from expansion of grease in the cylinder upon a rise in temperature.

It is frequently desirable to provide a chain-tightener with a means operative to prevent chain-tightening movement which might result from the force of gravity, or from other relatively small chain-tightening efforts, coupled with the tendency of the chain to whip when operated at high speeds. One such means is shown in Figs. 2 and 6, where we have illustrated a dished, resilient washer 65 which, in the assembled device, is axially distorted to bear frictionally against the support 10 and the ratchet 15 (Fig. 2) or the pinion 55 (Fig. 6). Such a washer acts as a friction brake which, while not interfering with chain-tightening movement produced by the grease gun, is capable of preventing the shaft 11 from rotating under the influence of gravity or other relatively small forces.

The effort required to effect retraction of the pawls 16 (Fig. 1) or 59 (Fig. 5) when the shaft 11 is advanced obviously opposes any chain-tightening movement. By properly co-ordinating the shape of the teeth-engaging pawl-portions with the forces resiliently urging them toward engagement, the pawls themselves may be adapted to serve as means for preventing undesired chain-tightening movement of the shaft 11.

The device illustrated in Fig. 7 is a modification of that shown in Figs. 5 and 6, in which a different means is employed to prevent adventitious chain-tightening. In this instance, the end of the cylinder 58 remote from the grease-inlet fitting 60 is closed and provided with a pressure-relief fitting 75. Further, the piston 57 is provided with an axial passage 57' extending through it and provided at the end remote from the inlet fitting 60 with a pressure-relief fitting 76. The fitting 76 has a somewhat higher relief pressure than the fitting 75.

In the operation of the modification illustrated in Fig. 7, grease under pressure is supplied to the cylinder 58 through the fitting 60. Fluid pressure in both ends of the cylinder 58 is thus increased, but the pressure in the remote end of the cylinder will be less than that in the other end by the relief pressure of the fitting 76. Accordingly, the piston 57 will be urged in the chain-tightening direction, any grease displaced from the remote end of the cylinder escaping through the fitting 75. In this arrangement, grease under pressure is retained in the cylinder between the two relief fittings 75 and 76 to oppose any tendency of the device to move in a chain-tightening direction except as a result of the supply of grease under pressure to the fitting 60.

While the devices illustrated in Figs. 1 to 4 depend upon relief fittings 31 and the devices of Figs. 5 to 7 upon shut-off fittings 60 to limit maximum chain-tightening effort, it is to be understood that any of the devices described, as well as other devices within the scope of our inventon, may employ either the pressure relief fitting, the shut-off fitting, or any equivalent means for limiting to a predetermined maximum the fluid pressure which results in chain-tightening. Generally, the pressure relief type of fitting is preferable where grease or other fluid is supplied at relatively low pressures, as by a manually operated gun, while the shut-off type of fitting is desirable where the actuating fluid is supplied at relatively high pressure, as by a power-operated device. Some power-operated, grease-supplying devices are capable of discharging grease under high pressure and at such a rate that the ordinary pressure-relief fitting 31 alone would be incapable of preventing the pressure within the fluid cylinder from rising above the desired maximum; and it is for that reason that the shut-off type of fitting is preferred when the chain tightener is to be supplied with fluid from a power-operated source.

Whether the means employed to limit maximum fluid pressure takes the form of the shut-off fitting 60 or the pressure-relief fitting 31 all the devices illustrated, as well as other devices within the scope of our invention, operate to prevent the existence of a chain-tightening effort greater than a predetermined maximum. As the devices are all adapted for operation by pressure lubricating apparatus such as is used in lubricating other parts of the machine with which the tightener is associated, it will almost inevitably be operated in the course of each periodic lubrication of the machine. Because of the pressure-limiting feature, no such operation of the tightener will result in a change of adjustment unless the chain is loose enough to require tightening.

The term "chain-tightener" as used herein is to be interpreted as including slack adjusters and other devices operative to vary the minimum length of the path over which the chain can travel. While all the devices shown and described embody a chain-engaging element in the form of an idler sprocket and an idler bearing which is angularly adjustable about an axis eccentric to the idler-axis, it is to be understood that the chain-engaging element need not be a sprocket, or even that it be rotatable. If the chain-engaging element of the tightener is a sprocket, it is not essential that it be a mere idler. Neither is it essential that the support for the chain-engaging element of the tightener be angularly adjustable in effecting chain-tightening; as such support can be mounted for movement of any character which will result in changing the length of the chain's path.

We claim as our invention:

1. In a chain-tightener, a sprocket, a bearing member on which said sprocket is rotatably mounted, a support from which said member is supported for adjustment about an axis eccentric to the sprocket axis, an actuating member for adjusting said bearing member in a chain-tightening direction, means for preventing movement of said bearing member in the opposite direction, hydraulic means actuatable by fluid under pressure for applying to said actuating member a force tending to move it to cause chain-tightening adjustment of said bearing member, said hydraulic means being normally free from fluid pressure and inoperative to produce chain-tightening adjustment of said bearing member, a fitting adapted for temporary connection to a lubricant gun and communicating with said hydraulic means to permit the supply of fluid under pressure thereto from such gun, and a valve for limiting to a predetermined maximum the pressure of fluid actuating said hydraulic means.

2. In a chain-tightener, a sprocket, a bearing member on which said sprocket is rotatably mounted, a support from which said member is supported for adjustment about an axis eccentric to the sprocket axis, an actuating member for adjusting said bearing member in a chain-tightening direction, hydraulic means actuatable by fluid under pressure for applying to said actuating member a force tending to move it to cause chain-tightening adjustment of said bearing member, said hydraulic means being normally free from fluid pressure and inoperative to produce chain-tightening adjustment of said bearing member, a fitting adapted for temporary connection to a lubricant gun and communicating with said hydraulic means to permit the supply of fluid under pressure thereto from such gun, and a valve for limiting to a predetermined maximum the pressure of fluid actuating said hydraulic means.

3. In a chain-tightener, a chain-engaging element, a support therefor, said support being movable to advance said element in a chain-tightening direction, means for limiting movement of said support in the opposite direction, hydraulic means actuatable by a fluid under pressure for applying to said support a force urging it in the chain-tightening direction, said hydraulic means being normally free from fluid pressure and inoperative to produce chain-tightening adjustment of said support, a fitting adapted for temporary connection to a lubricant gun and communicating with said hydraulic means to permit the supply of fluid under pressure thereto from such gun, and a valve for limiting to a predetermined maximum the pressure of fluid actuating said hydraulic means.

4. In a chain-tightener, a chain-engaging element, a support therefor, said support being movable to advance said element in a chain-tightening direction, hydraulic means actuatable by a fluid under pressure for applying to said support a force urging it in the chain-tightening direction, said hydraulic means being normally free from fluid pressure and inoperative to produce chain-tightening adjustment of said support, a fitting adapted for temporary connection to a lubricant gun and communicating with said hydraulic means to permit the supply of fluid under pressure thereto from such gun, and a valve for limiting to a predetermined maximum the pressure of fluid actuating said hydraulic means.

5. The invention set forth in claim 4 with the addition that said hydraulic means includes an expansible chamber having an inlet passage for the admission of fluid under pressure, said pressure-limiting device comprising a pressure-relief valve for said chamber.

6. The invention set forth in claim 4 with the addition that said hydraulic means includes an expansible chamber having an inlet passage for the admission of fluid under pressure, said pressure-limiting device comprising a pressure-responsive valve associated with said inlet passage and adapted to close when the pressure in said chamber attains a predetermined maximum.

7. In a chain-tightener, a sprocket, a bearing member on which said sprocket is rotatably mounted, a support from which said member is supported for adjustment about an axis eccentric to the sprocket axis, a pinion rigid with said bearing member, a stationary cylinder, a rod slidable within said cylinder and having rack-teeth engaging said pinion, said cylinder having an inlet passage for admitting fluid under pressure to cause said rod to move and rotate said bearing member in a chain-tightening direction, and pressure-responsive valve means for closing said passage when the pressure within said cylinder attains a predetermined maximum.

8. The invention set forth in claim 7 with the addition of a pressure-relief valve for said cylinder.

9. In a chain-tightener, a sprocket, a bearing member on which said sprocket is rotatably mounted, a support from which said member is supported for adjustment about an axis eccentric to the sprocket axis, a pinion rigid with said bearing member, a stationary cylinder, a rod slidable within said cylinder and having rack-teeth engaging said pinion, said cylinder having an inlet passage for admitting fluid under pressure to cause said rod to move and rotate said bearing member in a chain-tightening direction, said cylinder being normally free from fluid pressure and inoperative to produce chain-tightening movement of said rod, a fitting adapted for temporary connection to a lubricant gun and communicating with said cylinder to permit the supply of fluid under pressure thereto from such gun, and a pressure-relief valve for limiting to a predetermined maximum the fluid pressure existing in said cylinder.

10. In a chain-tightener, a sprocket, a bearing member on which said sprocket is rotatably mounted, a support from which said member is supported for adjustment about an axis eccentric to the sprocket axis, a pinion rigid with said bearing member, a stationary cylinder, a rod slidable within said cylinder and having rack-teeth engaging said pinion, said cylinder having an inlet passage for admitting fluid under pressure to cause said rod to move and rotate said bearing member in a chain-tightening direction, means for limiting rotation of said bearing member in the reverse direction, said cylinder being normally free from fluid pressure and inoperative to produce chain-tightening movement of said rod, a fitting adapted for temporary connection to a lubricant gun and communicating with said cylinder to permit the supply of fluid under pressure thereto from such gun, and a pressure-relief valve for limiting to a predetermined maximum the fluid pressure existing in said cylinder.

11. In a chain-tightener, a rotatable chain-engaging element, a support therefor, said support being movable to advance said element in a chain-tightening direction, hydraulic means actuatable by a fluid under pressure for applying to said support a force urging it in the chain-tightening direction, said hydraulic means being normally free from fluid pressure and inoperative to produce chain-tightening adjustment of said support, a fitting adapted for temporary connection to a lubricant gun and communicating with said hydraulic means to permit the supply of fluid under pressure thereto from such gun, and a valve for limiting to a predetermined maximum the pressure of fluid actuating said hydraulic means.

12. In a chain-tightener, a rotatable chain-engaging element, a support therefor, said support having a lubricant-passage for conveying lubricant to the interengaging faces of said element and support and being movable to advance said element in a chain-tightening direction, hydraulic means actuatable by a fluid under pressure for applying to said support a force urging it in the chain-tightening direction, said hydraulic means being normally free from fluid pressure, and fittings respectively communicating with said passage and hydraulic means, said fittings having similar provisions adapting them for connection alternatively to a lubricant gun.

WILLIAM V. COVERT.
GEORGE G. MIZE.

REFERENCES CITED

The following references are of record in the file of this patent:

UNITED STATES PATENTS

| Number | Name | Date |
|---|---|---|
| 708,332 | Ennor | Sept. 2, 1902 |
| 2,002,081 | Dow | May 21, 1935 |
| 2,051,488 | Kottlowski et al. | Aug. 18, 1936 |
| 2,258,465 | Mullaney | Oct. 7, 1941 |